(12) United States Patent
Sugimoto et al.

(10) Patent No.: US 9,671,116 B2
(45) Date of Patent: Jun. 6, 2017

(54) HOT WATER SUPPLY SYSTEM

(75) Inventors: Takeshi Sugimoto, Tokyo (JP); Toshiro Abe, Tokyo (JP); Tomoyoshi Obayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/110,981

(22) PCT Filed: May 27, 2011

(86) PCT No.: PCT/JP2011/002975
§ 371 (c)(1),
(2), (4) Date: Oct. 10, 2013

(87) PCT Pub. No.: WO2012/164600
PCT Pub. Date: Dec. 6, 2012

(65) Prior Publication Data
US 2014/0027524 A1     Jan. 30, 2014

(51) Int. Cl.
*F24D 19/10*     (2006.01)
*F24H 4/04*      (2006.01)
(Continued)

(52) U.S. Cl.
CPC ..... *F24D 19/1006* (2013.01); *F24D 17/0036* (2013.01); *F24D 17/02* (2013.01);
(Continued)

(58) Field of Classification Search
USPC ....................................................... 700/299
See application file for complete search history.

(56) References Cited

U.S. PATENT DOCUMENTS 2,157,910 A      5/1939    McCormick
4,333,002 A *    6/1982    Kozak ........................... 392/451
(Continued)

FOREIGN PATENT DOCUMENTS

CA      2151881 A1    12/1996
JP      61-36256 U     3/1986
(Continued)

OTHER PUBLICATIONS

International Search Report of the International Searching Authority mailed Jun. 21, 2011 for the corresponding international application No. PCT/JP2011/002975 (and English translation).
(Continued)

*Primary Examiner* — Alissa Tompkins
*Assistant Examiner* — John Bargero
(74) *Attorney, Agent, or Firm* — Posz Law Group, PLC

(57) ABSTRACT

A hot water supply system includes a hot water storage tank configured to store hot water, a plurality of temperature sensors that are installed in the height direction of the water storage tank and that detect temperatures at their installed positions, a main-unit-side hot water supply device that heats hot water in the hot water storage tank, a sub-unit-side hot water supply device, a main-unit-side control board equipped with control means that controls the corresponding hot water supply device, and a sub-unit-side control board. Signals sent from the temperature sensors are input in a distributed manner among the main-unit-side control board and the sub-unit-side control board, and each of the control boards are communicably connected to each other by a transmission line.

8 Claims, 1 Drawing Sheet

(51) Int. Cl.
  *F24H 9/20* (2006.01)
  *F24D 17/02* (2006.01)
  *F24D 17/00* (2006.01)

(52) U.S. Cl.
  CPC ........... *F24D 19/1051* (2013.01); *F24H 4/04* (2013.01); *F24H 9/2021* (2013.01); *F24D 2220/042* (2013.01); *F24D 2240/26* (2013.01); *Y02B 10/20* (2013.01); *Y02B 10/70* (2013.01)

(56) References Cited

U.S. PATENT DOCUMENTS

| | | | | |
|---|---|---|---|---|
| 4,672,529 | A | * | 6/1987 | Kupersmit ......... G05B 23/0235 700/1 |
| 5,808,277 | A | * | 9/1998 | Dosani et al. ................ 219/481 |
| 2007/0175883 | A1 | * | 8/2007 | Miu et al. .................... 219/400 |
| 2007/0205298 | A1 | * | 9/2007 | Harrison et al. ............. 237/2 B |
| 2009/0177827 | A1 | * | 7/2009 | Perisich .................. G06F 13/24 710/262 |
| 2009/0223465 | A1 | * | 9/2009 | Yamaoka ................ F24H 1/186 122/14.22 |
| 2010/0198417 | A1 | * | 8/2010 | Deivasigamani et al. .... 700/282 |

FOREIGN PATENT DOCUMENTS

| | | |
|---|---|---|
| JP | 2005-134062 A | 5/2005 |
| JP | 4139826 B | 8/2008 |
| WO | 00/36492 A2 | 6/2000 |

OTHER PUBLICATIONS

Extended European Search Report dated Nov. 13, 2014 issued in corresponding EP patent application No. 11866897.9 (and English translation).

Office Action mailed Sep. 9, 2014 issued in corresponding JP patent application No. 2013-517682 (and English translation).

Office Action mailed Jun. 25, 2015 in the corresponding CN application No. 201180071036.3 (English translation attached).

Office Action issued on Aug. 9, 2016 in the corresponding CN application No. 201180071036.3 (English translation attached).

* cited by examiner

HOT WATER SUPPLY SYSTEM

CROSS REFERENCE TO RELATED APPLICATION

This application is a U.S. national stage application of International Application No. PCT/JP2011/002975 filed on May 27, 2011.

TECHNICAL FIELD

The present invention relates to a hot water supply system that heats water and stores hot water in a hot water storage tank, and that is configured to allow hot water to be supplied to a hot water load from the hot water storage tank.

BACKGROUND ART

In a conventional heat pump hot water supply device, in order to perceive the amount of hot water stored inside a hot water storage tank, a plurality of hot water storing tanks is arranged in series and, among these hot water storing tanks, a bottom portion of the preceding one of two continuously connected hot water storing tanks and an top portion of the following one of the two continuously connected hot water storing tanks are connected to each other, temperature sensors (in this case, six temperature sensors) such as thermistors, which measure internal water temperatures, are each provided in the corresponding one of the hot water storing tanks, and the amount of stored hot water is determined by comparing a temperature from each of the temperature sensors with a set temperature (see Patent Literature 1, for example).

CITATION LIST

Patent Literature

Patent Literature 1: Japanese Patent No. 4139826 (p. 9, FIG. 1)

SUMMARY OF INVENTION

Technical Problem

The hot water supply device of Patent Literature 1 divides the hot water storage tank into plural hot water storing tanks and provides a temperature sensor inside each of the hot water storing tanks. Furthermore, control means provided separately from the hot water supply device performs operation control of the hot water supply device. Output from each of the temperature sensors (six sensors in this case) provided inside the hot water storing tanks is input to the control means via a circuit board included in the hot water supply device. Since there are six temperature sensors, a circuit board that is capable of receiving six inputs and outputting (one or more) output to the control means is accordingly required (a circuit board capable of seven or more input/output is required). The size of the circuit board thus becomes large. Furthermore, there is a possibility of increase in the production cost and increase in the size of the control box of the hot water supply device. In some cases, there is a possibility of the size of the hot water supply device itself becoming large. Additionally, other than wiring work on the wiring that transmits the input of each temperature sensor inside the corresponding hot water storing tank to the hot water supply device, wiring work on the wiring from the hot water supply device to the control means is also required.

As such, the present invention is addressed to obtain a hot water supply system that reduces the size of the circuit board, as well as to a system that allows the hot water storage amount and the like to be detected by accurately detecting the temperature and the like inside the hot water storage tank.

Solution to Problem

A hot water supply system according to the invention includes a hot water storage tank configured to store hot water, a plurality of temperature sensors that is installed in a height direction of the water storage tank and that detects temperatures at each of their installed positions, a plurality of hot water supply devices that heats hot water in the hot water storage tank, and control boards each including control means that controls the corresponding hot water supply device and input ports configured to input signals from the temperature sensors. Signals sent from the temperature sensors are input in a distributed manner among the control boards, and each of the control boards are communicably connected to each other.

Advantageous Effects of Invention

In the hot water supply system according to the invention, the signals from the temperature sensors are input in a distributed manner among the plurality of control boards and each of the control boards are transmissibly connected to each other; hence, the number of signal input ports in each of the control boards can be reduced. Accordingly, each control board can be configured with a compact circuit board and cost can be reduced. For example, in the hot water storage tank, four to six temperature sensors, for example, are disposed and in a case in which there are two control boards, the system is configured with control boards that each has, for example, three input ports such that two to three signals can be input.

DESCRIPTION OF EMBODIMENTS

Embodiment 1

Figure 1:
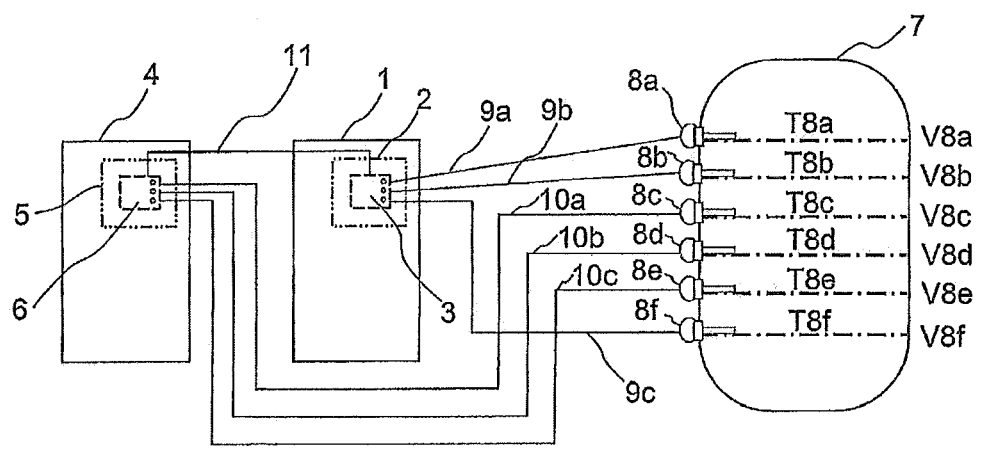
FIG. 1 is a diagram illustrating a configuration of a hot water supply system according to Embodiment 1 of the invention.

FIG. 1 is a diagram illustrating a configuration of a hot water supply system according to Embodiment 1 of the invention including hot water supply devices and a hot water storage tank. As illustrated in FIG. 1, the hot water supply system according to Embodiment 1 carries out processes related to hot water supply, such as heating water, with the two hot water supply devices. In Embodiment 1, as regards the two hot water supply devices, one is referred to as a main-unit-side hot water supply device 1 and the other is referred to as a sub-unit-side hot water supply device 4, and the main-unit-side hot water supply device 1 mainly performs operations related to hot water supply. Now, although not limited to a heat pump circuit (refrigerant circuit), the main-unit-side hot water supply device 1 and the sub-unit-side hot water supply device 4 constitutes a heat pump circuit (refrigerant circuit) that circulates a refrigerant by connecting a compressor, a condenser, an expansion device, and an evaporator with pipes. Furthermore, water is heated by having the refrigerant release heat in the condenser and carry out heat exchange.

Referring to FIG. 1, the main-unit-side hot water supply device 1 includes a main-unit-side control board 3 inside a main-unit-side control box 2. Furthermore, the sub-unit-side hot water supply device 4 includes a sub-unit-side control board 6 inside a sub-unit-side control box 5. The main-unit-side control board 3 is a circuit board having control means, such as a computer, that performs control of each of the units included in the main-unit-side hot water supply device 1. Similarly, the sub-unit-side control board 6 is a circuit board that performs control of each of the units included in the sub-unit-side hot water supply device 4. The main-unit-side control board 3 uses detection temperatures as data to perform control, temperatures which are related to the detection of temperature sensors 8a to 8f, such as, for example, thermistors, that are provided in a hot water storage tank 7. Connection of the main-unit-side control board 3 and the sub-unit-side control board 6 to the temperature sensors 8a to 8f will be described later.

The hot water storage tank 7 is a tank to store hot water related to heating of the main-unit-side hot water supply device 1 and the sub-unit-side hot water supply device 4. For example, a water supply pipe (not shown), a hot water delivering pipe (not shown), and the like are connected to the hot water storage tank 7. Water is supplied from the lower portion of the hot water storage tank 7 through the water supply pipe and hot water is delivered to a hot water load through the hot water delivering pipe. Note that the hot water storage tank 7 in Embodiment 1 is a hot water storage tank of a closed type.

Furthermore, the hot water storage tank 7 of a closed type is provided with temperature sensors 8a, 8b, 8c, 8d, 8e, and 8f from the upper portion to the lower portion (in the height direction) inside the hot water storage tank 7. The temperature sensors 8a to 8f are temperature detection means configured to detect the amount and the like of the stored hot water inside the hot water storage tank 7. For example, when it is determined that a temperature difference equivalent to or larger than a predetermined temperature difference exists between the temperature sensor 8b and the temperature sensor 8c, then the water surface can be determined to be positioned between the temperature sensor 8b and the temperature sensor 8c. Electric resistance in each of the temperature sensors 8a to 8f changes according to the temperature. Each temperature sensor outputs a direct current signal of, for example, 4 to 20 mA according to the detection temperature.

Now, in Embodiment 1, since the main-unit-side hot water supply device 1 principally performs the control on the basis of the temperature and the like of the hot water inside the hot water storage tank 7, signals related to the temperatures of the temperature sensors 8 that are at positions required to perform control are preferentially input to the main-unit-side control board 3. Basically, the positions at the most upper portion and the lowest portion are required. Furthermore, the adequate number of inputs of the signal by connection of wires to a single circuit board is two to three. Accordingly, in Embodiment 1, connecting lines 9a, 9b, and 9c are connected in order to input signals related to the temperatures detected with the temperature sensors 8a, 8b, and 8f to the main-unit-side control board 3 included in the main-unit-side hot water supply device 1. Furthermore, connecting lines 10a, 10b, and 10c are connected in order to input signals related to the temperatures detected with the temperature sensors 8c, 8d, and 8e inside the hot water storage tank 7 to the sub-unit-side control board 6 included in the sub-unit-side hot water supply device 4. In addition, a transmission line 11 for communication between the main-unit-side control board 3 of the main-unit-side hot water supply device 1 and the sub-unit-side control board 6 of the sub-unit-side hot water supply device 4 is connected, such that, for example, the main-unit-side control board 3 can obtain data of the temperature related to the detection of the temperature sensors 8a to 8f.

There is a hot water supply system for business use used in, for example, welfare facilities, hospitals, hotels, dormitories, education centers, and golf courses. Considering that the capacity of a single hot water supply device is about 20 HP (a heating capacity of about 40 kW), the hot water supply systems configured with a plurality of hot water supply devices account for about 70% of the total the hot water supply systems for business use.

Now, it is preferable that four to six or more temperature sensors serving as temperature detection means are disposed inside the hot water storage tank in the height direction in order to accurately perceive the amount of stored hot water inside the hot water storage tank. However, if a control board configured to receive inputs of signals from six sensors is provided in a single hot water supply device, for example, then, the control board becomes large in size and becomes a cause of cost increase.

As described above, since the share of the system being configured with a plurality of hot water supply devices is high, (in light of risk distribution) the hot water supply system of Embodiment 1 employs, in every one hot water supply device, a control board that allows the signals to be input from, for example, three temperature sensors inside the hot water storage tank through connecting lines. Furthermore, (in light of risk distribution) the hot water supply system allows the signals to be input in a distributed manner among the plurality of hot water supply devices and, further, allows communication by connecting the circuit board of each of the hot water supply devices together with a transmission line.

Additionally, by having the signals related to the temperatures of the temperature sensors 8 at positions required to perform control be preferentially input to the main-unit-side control board 3, even if communication between the circuit boards cannot be implemented, it is possible to determine the amount and the like of the stored hot water with only the signals input to the main-unit-side control board 3.

Description of an operation will be given next. Inside the closed-type hot water storage tank 7, once-through heating is carried out which instantly increases the temperature of the supplied water from the water supply pipe (not shown) at the lower portion of the hot water storage tank 7 to a set temperature, and hot water is supplied to a hot water load (not shown), such as, for example, a bath, from the hot water delivering pipe (not shown) at the upper portion of the hot water storage tank 7. At this time, an amount of water equivalent to the amount used to supply hot water is supplied into the hot water storage tank 7. As such, a high temperature portion and a low temperature portion are formed and a thermal stratification is thus formed in the water inside the hot water storage tank 7.

Furthermore, water is supplied from the lower portion of the hot water storage tank 7 to a water supply inlet (not shown) of each of the main-unit-side hot water supply device 1 and the sub-unit-side hot water supply device 4, and heated hot water from a water supply outlet (not shown) of each of the main-unit-side hot water supply device 1 and the sub-unit-side hot water supply device 4 is stored in the upper portion (not shown) of the hot water storage tank 7.

From the above, a temperature gradient is occurred from the upper portion to the lower portion of the hot water stored inside the hot water storage tank 7. The lower portion is lower in temperature than the upper portion, and a thermal stratification is formed. Furthermore, since the temperature sensors 8a, 8b, 8c, 8d, 8e, and 8f are provided inside the hot water storage tank 7 in the height direction from the upper portion towards the lower portion, the amount of stored hot water (the amount of hot water maintained at the set temperature, for example) is determined on the basis of a comparison between the temperatures related to the detection of the temperature sensors 8a to 8f and the set temperature (55 degrees C., for example).

Now, as illustrated in FIG. 1, when assuming that the amount of stored hot water corresponding to the disposed position of the temperature sensor 8f is 100%, the amount-of-stored-hot-water (remaining hot water) rate (hereinafter, referred to as "stored hot water amount") is assumed to be 10% (V8a). Furthermore, the stored hot water amount (remaining hot water) corresponding to the disposed position of the temperature sensor 8b is assumed to be 30% (V8b). Similarly, the amount-of-stored-hot-water (remaining hot water) rate corresponding to the disposed position of the temperature sensor 8c is assumed to be 50% (V8c), and the stored hot water amount corresponding to the disposed position of the temperature sensor 8d is assumed to be 60% (V8d). Furthermore, the stored hot water amount (remaining hot water) corresponding to the disposed position of the temperature sensor 8e is assumed to be 80% (V8e).

Additionally, the temperature detected by the temperature sensor 8a is referred to as T8a, and the temperature detected by the temperature sensor 8b is referred to as T8b. The temperature detected by the temperature sensor 8c is referred to as T8c, and the temperature detected by the temperature sensor 8d is referred to as T8d. Additionally, the temperature detected by the temperature sensor 8e is referred to as T8e, and the temperature detected by the temperature sensor 8f is referred to as T8f.

A computing method of the stored hot water amount (remaining hot water) of the hot water storage tank 7 and the mean stored-hot-water temperature, the computing method which is conducted by the main-unit-side control board 3 according to Embodiment 1, will be described next. Among the temperatures related to the detection of the temperature sensors 8a to 8f, ones that are equivalent to or higher than a set temperature Te (for example, 55 degrees C.) are selected. Then, among the selected temperatures, the temperature related to the detection of the temperature sensor on the lowest position is designated as a representative temperature. For example, when temperature T8a, temperature T8b, temperature T8c, and temperature T8d are equivalent to or above 55 degrees C., then temperature T8d is selected as the representative temperature.

The representative temperature is then referred to as T$8_n$, and the stored hot water amount at the temperature sensor 8 related to the detection of the representative temperature T$8_n$ is referred to as V$8_n$. Furthermore, when the temperature related to the detection of the temperature sensor 8 that is disposed at a position one sensor below the temperature sensor 8 related to the detection of the representative temperature T$8_n$ is referred to as T$8_{n+1}$, and the stored hot water amount corresponding to the disposed position is referred to as V$8_{n+1}$, then the stored hot water amount is expressed by the following Equation (1). Additionally, the mean stored-hot-water temperature is assumed to be the mean stored-hot-water temperature of the temperature sensors that are positioned between the temperature sensor 8a and the temperature sensor 8 that is related to the detection of the representative temperature T$8_n$.

$$\text{The current stored hot water amount} = V8_n + (T8_n - Te) \times (V8_{n+1} - V8_n)/(T8_n - T8_{n+1}) \quad (1)$$

For example, when the representative temperature T8d is 60 degrees C., the stored hot water amount V8d corresponding to T8d is 60%. Furthermore, when T8e that is T$8_{n+1}$ is assumed to be 30 degrees C., since the stored hot water amount V8e corresponding to T8e is 80%, the current stored hot water amount is expressed by Equation (2). In addition, the mean stored-hot-water temperature is expressed by Equation (3).

$$\begin{aligned}
\text{The current stored hot water amount} &= V8d + (T8d - 55) \times (V8e - V8d)/(T8d - T8e) \\
&= 60\% + (60 \text{ degrees C} - 55 \text{ degrees C}) \times (80\% - 60\%)/(60 \text{ degrees C} - 30 \text{ degrees C}) \\
&= \text{approximately } 63\%
\end{aligned} \quad (2)$$

$$\text{The mean stored-hot-water temperature} = (T8a + T8b + T8c + T8d)/4 \quad (3)$$

Furthermore, the main-unit-side control board 3 performs operation control on the basis of whether the current stored hot water amount has reached the target stored hot water amount. Operation control is carried out after setting the target stored hot water amount in accordance with conditions. For example, during daytime, the target stored hot water amount is set to 50%, during nighttime the target stored hot water amount is set to 100%, and 10% is set for preventing water shortage.

As above, in the hot water supply system of Embodiment 1, the signals from the temperature sensors 8a to 8f are distributed among the main-unit-side control board 3 and the sub-unit-side control board 6 and is input through the respective one of the connecting lines 9a to 9c and the connecting lines 10a to 10c, and, further, the main-unit-side control board 3 and the sub-unit-side control board 6 are transmissibly connected to each other; hence, it is possible to reduce the number of signal ports of each control board. Accordingly, each control board can be configured with a compact circuit board and cost can be reduced.

Furthermore, since the signal of each of the temperature sensor 8a at the most upper portion and the temperature sensor 8b at the most lower portion, each of which is a sensor 8 that sends signals related to the temperatures to the main-unit-side control board 3, is input so that the signals related to the temperatures at positions required to perform control are preferentially input to the main-unit-side control board 3, even if there were to be any communication failure between the main-unit-side control board 3 and the sub-unit-side control board 6, as long as determination of the target stored hot water amount of 100% during nighttime and determination of 10% for preventing water shortage, for example, can be carried out, it is possible to carry out the required control, such as securing full water level of the stored hot water amount and preventing adverse effects from occurring owing to shortage of water. Furthermore, even if there is a malfunction, for example, in either one of the hot water supply devices, the stored hot water amount corresponding to the positions of the respective temperature sensors can be determined and failure of the whole hot water supply system can thus be prevented. Moreover, control of the hot water supply operation can be performed without the need to provide control means except for the one in the hot water supply device; hence, it will be possible to simplify the installation work and lead to cost reduction.

Embodiment 2

Figure 2:
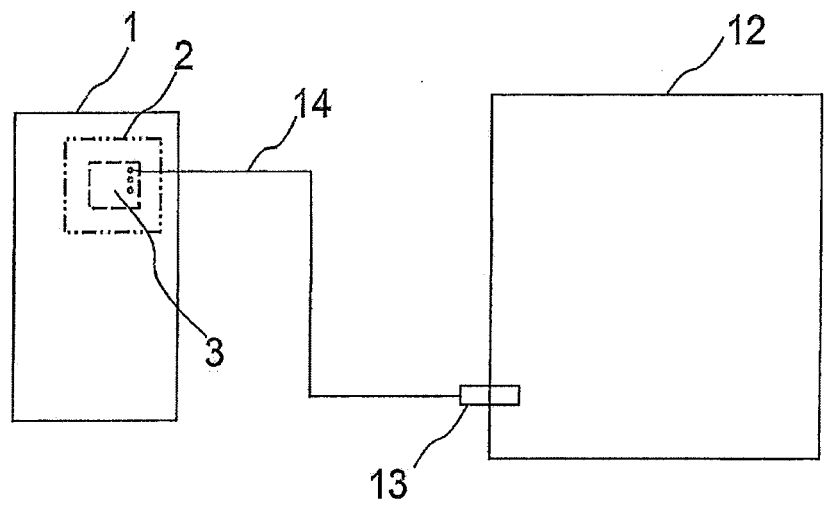
FIG. 2 is a diagram illustrating a configuration of a hot water supply system according to Embodiment 2 of the invention.

FIG. 2 is a diagram illustrating a configuration of a hot water supply system according to Embodiment 2 of the invention. Referring to FIG. 2, a hot water storage tank 12 is an open-type hot water storage tank.

In Embodiment 1, description has been given of a closed-type hot water storage tank 7; however, there are cases in which the hot water supply system is configured by combining the open-type hot water storage tank 12 that is in communication with the atmosphere, and a hot water supply device. In such a case, the stored hot water amount in the open-type hot water storage tank 12 is measured with a water level sensor (pressure sensor) 13. The water level sensor 13 outputs a direct current signal of 4 to 20 mA according to the detected pressure (water pressure) between 0 to 50 kPa. As such, it is possible to use the port for the temperature sensor 8 of Embodiment 1. The water level sensor 13 and the main-unit-side control board 3 of the main-unit-side hot water supply device 1 are connected with a connecting line 14. Even when the open-type hot water storage tank 12 is connected to the main-unit-side control board 3 of the main-unit-side hot water supply device 1, by having the same port as the port for the temperature sensor of the closed-type hot water storage tank 7, regardless of whether the hot water supply device is a closed-type or an open-type, the same main-unit-side control board 3 can be made to deal with the hot water storage tank.

REFERENCE SIGNS LIST 1 main-unit-side hot water supply device; 2 main-unit-side control box; 3 main-unit-side control board; 4 sub-unit-side hot water supply device; 5 sub-unit-side control box; 6 sub-unit-side control board; 7, 12 hot water storage tank; 8a-8f temperature sensor; 9a-9c, 10a-10c, 14 connecting line; 11 transmission line; 13 water level sensor.

The invention claimed is:

1. A hot water supply system, comprising:
a hot water storage tank configured to store hot water;
a plurality of temperature sensors installed in a height direction of the hot water storage tank, each temperature sensor detecting a temperature of a corresponding installation position;
a plurality of hot water supply devices, each of the hot water supply devices storing and heating hot water and configured to supply the hot water stored therein to the hot water storage tank; and
a first control board and a second control board, each of the first and second control boards being associated with a different corresponding one of the plurality of hot water supply devices, each of the first and second control boards being equipped with a control unit that controls the corresponding one of the hot water supply devices, the first control board has at least a first input port and a second input port, the second control board has at least a third input port, wherein
the plurality of temperature sensors are divided into a first group and a second group, temperature sensors of the first group are directly connected by wires with the first control board, temperature sensors of the second group are directly connected by wires with the second control board, the wires of the first group include a first wire and a second wire, the wires of the second group include a third wire, the wires of the first group are different from the wires of the second group, a signal transmitted from the temperature sensor of the first group is input in the first control board, a signal transmitted from the temperature sensor of the second group is input in the second control board, and the signal input from the temperature sensor includes detection temperature data detected by the temperature sensor,
each of the first and second control boards are directly connected to each other by a transmission line; and the second control board transmits over the transmission line, directly to the first control board, the detection temperature data that is detected by the temperature sensor of the second group connected with the second control board,
the first group of temperature sensors connected to the first control board include a first temperature sensor that is installed at a highest position in the height direction and directly connected to the first input port of the first control board by the first wire, and a second temperature sensor that is installed at a lowest position in the height direction and directly connected to the second input port of the first control board by the second wire, a signal from the first temperature sensor installed at the highest position is directly input from the first temperature sensor to the first input port of the first control board over the first wire, and a signal from the second temperature sensor installed at lowest position is directly input from the second temperature sensor to the second input port of the first control board over the second wire, and
the second group of temperature sensors connected to the second control board include at least one temperature sensor that that is installed between the highest position and the lowest position in the height direction and directly connected to the third input port of the second control board by the third wire, and a signal from the at least one temperature sensor that is installed between the highest position and the lowest position is directly input from the at least one temperature sensor to the third input port of the second control board over the third wire.

2. The hot water supply system of claim 1, wherein, in each control board of the first and second control boards, a number of input ports for the signals from the temperature sensors is three and a number of signal inputs is two or three.

3. The hot water supply system of claim 1, wherein input ports that are provided in each of the first and second control boards and that receive the signals from the temperature sensors are capable of receiving a signal from a water level sensor installed in the hot water storage tank.

4. The hot water supply system of claim 1, wherein, in a single control board of the first and second control boards, a number of input ports for the signals from the temperature sensors is three and a number of signal inputs is two or three.

5. The hot water supply system of claim 1, wherein input ports that are included in the first and second control boards and that are the input ports of the signals from the temperature sensors are capable of being input with a signal from a water level sensor installed in the hot water storage tank.

6. The hot water supply system of claim 2, wherein input ports that are included in the first and second control boards and that are the input ports of the signals from the temperature sensors are capable of being input with a signal from a water level sensor installed in the hot water storage tank.

7. The hot water supply system of claim 4, wherein input ports that are included in the first and second control boards and that are the input ports of the signals from the temperature sensors are capable of being input with a signal from a water level sensor installed in the hot water storage tank.

8. The hot water supply system of claim 1, further comprising
a transmission line connecting the first and second control boards together;
wherein in each of the first and second control boards, a number of input ports for the signals from the temperature sensors is fewer than a number of signal inputs from the plurality of temperature sensors,
wherein
the detection temperature data which is transmitted by the second control board to the first control board is transmitted over the transmission line,
the detection temperature data which is transmitted by the second control board to the first control board is an individual temperature for a temperature sensor as received as input from an individual one of the temperature sensors at the second control board,
the at least another one of the first and second control boards is configured to perform a computing method which uses (i) the detection temperature data of individual ones of the sensors, received via the transmission line from one the one of the first and second control boards, and (ii) the detection temperature data which is received as input to the another one of the first and second control boards from the temperature sensors.

* * * * *